No. 813,002. PATENTED FEB. 20, 1906.
J. HORMBY.
GAGE FOR IVORY NUT SAWS.
APPLICATION FILED MAY 12, 1905.
2 SHEETS—SHEET 1.
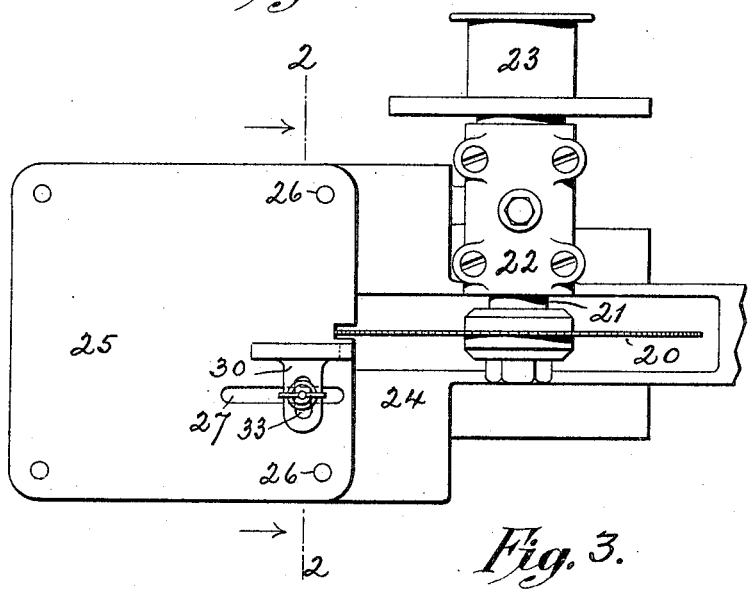
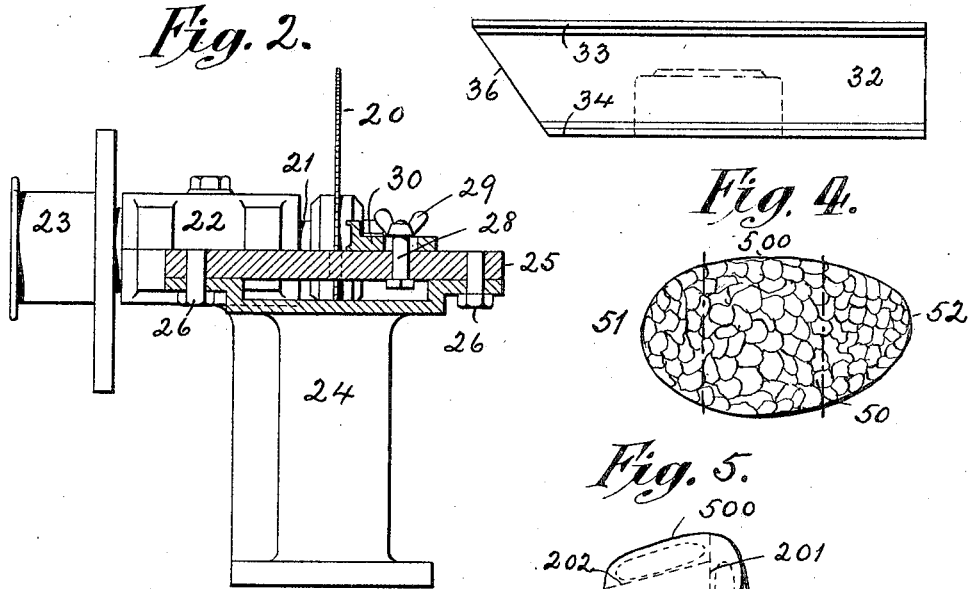
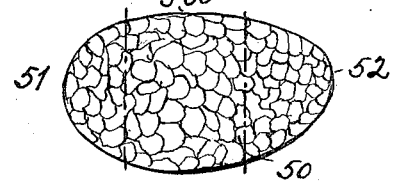
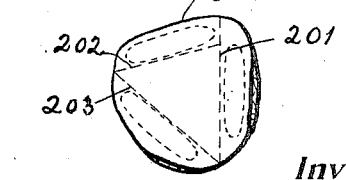
Attest:
Herman Meyer
Stephen S. Newton
Inventor:
John Hormby
by William R. Baird
his Atty.

No. 813,002. PATENTED FEB. 20, 1906.
J. HORMBY.
GAGE FOR IVORY NUT SAWS.
APPLICATION FILED MAY 12, 1905.
2 SHEETS—SHEET 2.
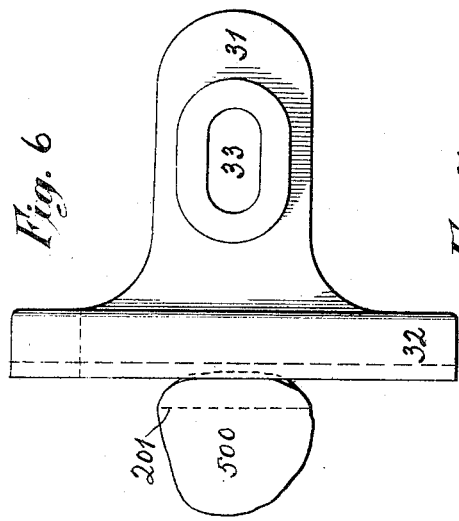
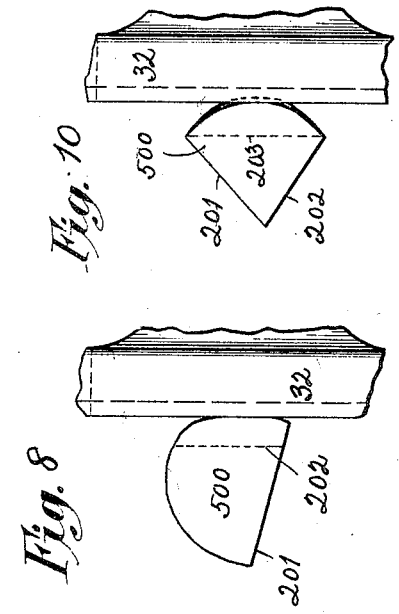
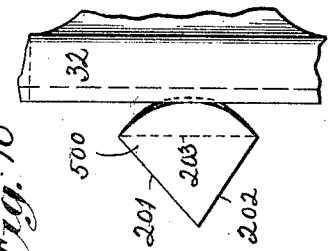
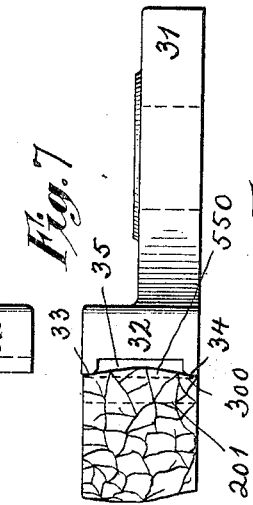
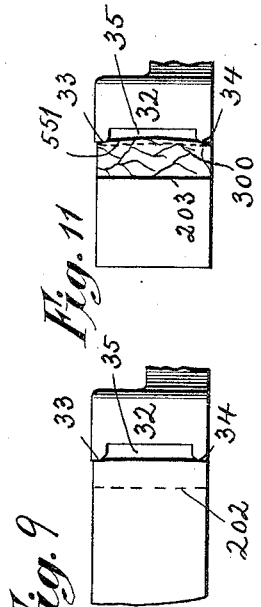
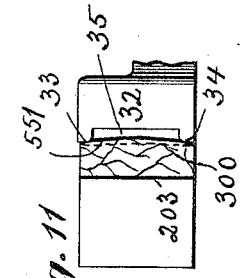
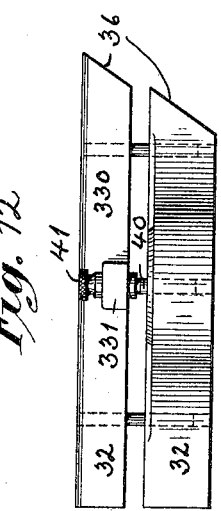
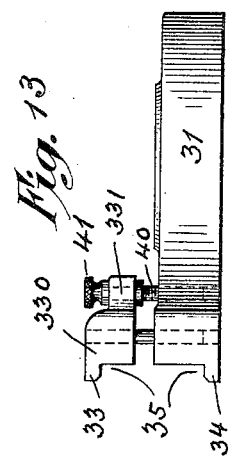
Attest:
Herman Meyer
Stephen B. Newton
John Hormby, Inventor:
by William R. Baird
his Atty.

UNITED STATES PATENT OFFICE.

JOHN HORMBY, OF NEW YORK, N. Y.

GAGE FOR IVORY-NUT SAWS.

No. 813,002.  Specification of Letters Patent.  Patented Feb. 20, 1906.

Application filed May 12, 1905. Serial No. 260,103.

*To all whom it may concern:*

Be it known that I, JOHN HORMBY, a citizen of the United States, residing at New York, in the county of New York and State of New York, have invented certain new and useful Improvements in Gages for Ivory-Nut Saws, of which the following is a specification.

My invention relates to ivory-nut saws, and more particularly to the gages employed therewith; and its novelty consists in the construction and adaptation of the parts, as will be more fully hereinafter pointed out. In cutting from ivory nuts the pieces or blanks which are subsequently to be fashioned into buttons several precautions are to be observed if the best results are to be secured. The usable portion of the nut is away from the center and near the surface. Other things being equal, the nearer to the surface the button is cut the better it will be. The blanks must also be cut so that a substantially uniform thickness is secured for each blank; otherwise the excess portion will be wasted. A substantially uniform width is also required to secure the greatest economy in the subsequent turning and drilling operations. In cutting the nut now according to the best modern practice the primary cuts are first made by removing the ovoid ends, the sawing-planes being practically at right angles to the longitudinal axis of the nut. This leaves a piece having two substantially plane sides and having in cross-section a rough triangular outline—as shown, for instance, in Figs. 5 and 6. This piece is then ready for the secondary cuts, which are required to be made in planes at right angles to the primary cuts. In other words, pieces are to be cut from its sides, leaving a little triangular prism. In cutting these secondary pieces great difficulty has been met with, because of the fact that the sides are not flat, but bulge outwardly in some portions and are quite flat in others. If, therefore, the usual saw-gage is employed and it is set so as to cut the proper width from the flat portion of the nut, it will be set so that too little is cut from the bulging portion of the nut. In order to overcome this difficulty, I have invented the gage which forms the subject-matter of this application and which, in brief, is provided with two parallel guiding edges, with a recess between them, and preferably provided, also, with means for varying the distance between such guiding edges and with means whereby the distance between the plane of said edges and the cutting-plane may be varied.

In the drawings, Figure 1 is a top plan view of an ivory-nut saw provided with my improved gage. Fig. 2 is a front elevation and partial vertical section on the plane of the line 2 2 in Fig. 1. Fig. 3 is an enlarged front elevation of my improved gage. Fig. 4 is a view of an ivory nut with the primary cutting-planes indicated by dotted lines. Fig. 5 represents the central portion of such a nut after the ends have been removed viewed from the side from which one of such ends has been cut, the secondary cutting-planes being indicated by dotted lines and the buttons to be cut from the pieces after removal being also similarly indicated. Fig. 6 is a top plan view of one form of my improved gage, showing the nut in place to receive the first of the secondary cuts, and Fig. 7 is a side elevation thereof. Fig. 8 is a top plan view of a portion of the same gage, showing the piece of nut in position to receive the second secondary cut, and Fig. 9 is a side elevation thereof. Fig. 10 is a top plan view of a portion of the same gage, showing the piece of nut in position to receive the third secondary cut; and Fig. 11 is a side elevation thereof. Fig. 12 is a rear elevation of a form of the gage which embodies the severally new features of the present invention, and Fig. 13 is a side elevation thereof.

In the drawings, 20 is a circular saw mounted upon a spindle 21, running in a journal 22 and actuated by a pulley 23, receiving its power from a belt, (not shown,) the whole being supported from a base-plate 24. In front of the saw is arranged a horizontal sawing-table 25, secured to the base in any suitable manner—as, for instance, the bolts 26 26—and provided with a slot 27. Adapted to rest upon the table in a suitable position with respect to the saw 20 is my improved gage 30.

In the form shown in Figs. 1 to 3 and 6 to 11 this gage comprises a flat base-plate 31, adapted to rest upon the table 25, and an upright guide member 32. The base-plate is provided with a transverse slot 33, adapted to receive a bolt 28, having a wing-nut 29, by which it may be adjustably secured to the table 25 in a manner which needs no particular description. The upright guide member 32 is provided with two guiding edges 33 and 34, parallel with each other and in a plane parallel to the cutting-plane of the saw, while between them is a recess 35. The forward edge 36 of the upright member 32 is beveled roughly to conform to the trend of the saw at the point where it passes that edge.

In Figs. 12 and 13 there is illustrated a form of my device provided with means for varying the distance between the guiding edges 33 and 34. In this form the member 32 is divided horizontally. The upper portion 330 is provided with a rearwardly-projecting threaded bracket 331, and the base-plate 31 is similarly threaded to receive a screw 40, provided with a milled head 41, whereby the upper part 330 may be moved to or from the base-plate, registering pins 332 and 333 serving to keep the parts in alinement in their several positions. The nut to be cut is designated 50, the ovoid end pieces being termed 51 and 52, respectively, and the central piece being termed 500. After the nut has received the primary cuts, as shown in Fig. 4, and the piece 500 is formed it is of the shape shown in top plan view in Fig. 5, in which the secondary cutting-planes are represented by the dotted lines 201, 202, and 203, respectively.

In Figs. 6 and 7 the piece 500 is shown ready to be moved along the gage 30 toward the saw to receive the cut 201. It will be noticed that the rounded portion 550 of the nut projects within the recess 35, so that if the plane indicated by the dotted line 300 is passed through the edges 33 and 34 the portion of the nut between the planes 201 and 300 is perfectly solid and all usable.

In Figs. 8 and 9 the piece 500 is shown in position for the second secondary cut along the plane of the line 202. In this case the surface of the piece adjacent to the recess 35 scarcely projects within it, although with some nuts there might be such a projection, because their form is very irregular.

In Figs. 10 and 11 the piece is shown in position for the third secondary cut along the plane of the line 203. In this case the dotted line 300 represents, as before, the vertical plane passing through the guiding edges 33 and 34, and the recess 35 is adapted to receive the outwardly-projecting portion of the piece 500 beyond the plane 300, and the effective thickness of the piece cut is that which lies between the planes 300 and 203.

What I claim as new is—

1. In a machine of the kind described, a gage for an ivory-nut saw provided with two edges in a plane parallel to the cutting-plane of the saw and having between them a recess.

2. In a machine of the kind described, a gage for an ivory-nut saw provided with two edges in a plane parallel to the cutting-plane, having between them a recess, and provided with means for varying the distance between the edges.

3. In a machine of the kind described, a gage for an ivory-nut saw provided with two edges in a plane parallel to the cutting-plane, having between them a recess, and provided with means for varying the distance between the plane of said edges and the said cutting-plane.

4. In a machine of the kind described, a gage for an ivory-nut saw, said gage being constructed to provide for two edges in a plane parallel to the cutting-plane, having between them a recess, and comprising a base member having one of said edges, an upper member having the other of said edges and adjusting means connecting said members with each other.

5. In a machine of the kind described, a gage for an ivory-nut saw provided with two edges in a plane parallel to the cutting-plane, having between them a recess, and provided with means for varying the distance between the plane of said edges and the said cutting-plane, comprising a transverse slot in the base of the gage and a bolt adapted to pass through the slot to secure the gage in position.

6. In a machine of the kind described, a gage for an ivory-nut saw provided with two edges in a plane parallel to the cutting-plane of the saw and having between them a recess, in combination with a base-plate in a plane at an angle to the cutting-plane.

7. In a machine of the kind described, a gage for an ivory-nut saw provided with two edges in a plane parallel to the cutting-plane of the saw and having between them a recess, in combination with a base-plate in a plane at an angle to the cutting-plane, and means for varying the distance between the said edges.

8. In a machine of the kind described, a gage for an ivory-nut saw provided with two edges in a plane parallel to the cutting-plane of the saw and having between them a recess, in combination with a base-plate in a plane at an angle to the cutting-plane, provision being made for varying the distance between the said edges, one edge being carried by a separable upper member connected to the base of the gage by screws or bolts.

9. In a machine of the kind described, a gage for an ivory-nut saw provided with two edges in a plane parallel to the cutting-plane of the saw and having between them a recess, in combination with a base-plate in a plane at an angle to the cutting-plane and provided with means for varying the distance between the plane of said edges and the said cutting-plane.

10. In a machine of the kind described, a gage for an ivory-nut saw provided with two edges in a plane parallel to the cutting-plane of the saw and having between them a recess, in combination with a base-plate in a plane at an angle to the cutting-plane and provided with means for varying the distance between the plane of said edges and the said cutting-plane, comprising a slot in the base-plate connected to the supporting means for the gage by screws or bolts.

11. In a machine of the kind described, a gage for an ivory-nut saw provided with two guiding edges in the same vertical plane and recessed between them away from the plane of the saw.

In testimony whereof I affix my signature in presence of two witnesses.

JOHN HORMBY.

Witnesses:
    STEPHEN S. NEWTON,
    MAY HUGHES.